(12) United States Patent
Ozawa et al.

(10) Patent No.: US 7,781,909 B2
(45) Date of Patent: Aug. 24, 2010

(54) CONTROL CIRCUIT OF POWER SUPPLY, POWER SUPPLY AND CONTROL METHOD THEREOF

(75) Inventors: Hidekiyo Ozawa, Kasugai (JP); Morihito Hasegawa, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 0 days.

(21) Appl. No.: 11/516,611

(22) Filed: Sep. 7, 2006

(65) Prior Publication Data
US 2007/0217108 A1    Sep. 20, 2007

(30) Foreign Application Priority Data
Mar. 17, 2006    (JP)    ............... 2006-074777

(51) Int. Cl.
H02J 1/00    (2006.01)
H02J 3/14    (2006.01)
(52) U.S. Cl. ........................................... 307/39
(58) Field of Classification Search .............. 307/31, 307/18, 39, 43, 45, 85
See application file for complete search history.

(56) References Cited

U.S. PATENT DOCUMENTS

| | | | |
|---|---|---|---|
| 5,426,347 A | 6/1995 | Nilssen | |
| 6,028,468 A | 2/2000 | Menniti et al. | |
| 6,894,466 B2 * | 5/2005 | Huang et al. | 323/272 |
| 6,903,537 B2 * | 6/2005 | Tzeng et al. | 323/268 |
| 6,917,190 B2 | 7/2005 | Matsuo et al. | |
| 7,443,147 B2 | 10/2008 | Kasai et al. | |
| 2007/0242557 A1 | 10/2007 | Ozawa et al. | |

FOREIGN PATENT DOCUMENTS

| | | |
|---|---|---|
| CN | 1469216 A | 1/2004 |
| JP | 07-111314 A | 4/1995 |
| JP | 07-176624 A | 7/1995 |
| JP | 2002-111470 A | 4/2002 |
| JP | 2002-112542 | 4/2002 |
| KR | 10-2000-0074998 | 12/2002 |
| TW | I309911 | 5/2009 |

OTHER PUBLICATIONS

Chinese Office Action, dated May 23, 2008, 14 pgs.

* cited by examiner

*Primary Examiner*—Albert W Paladini
*Assistant Examiner*—Carlos Amaya
(74) *Attorney, Agent, or Firm*—Arent Fox LLP (57) ABSTRACT

It is intended to provide a control circuit of power supply, a power supply and a control method thereof capable of achieving power saving in an integrated circuit and reducing a delay time of the integrated circuit. The control circuit 50 of a power supply 10 which outputs plural DC voltages VCC, VBGP, VBGN each having a different voltage value includes a voltage changing portion SW1 which detects an output current I1 relating to a first DC voltage VCC which is one of the plural DC voltages and sets at least one DC voltage except the first DC voltage VCC based on the detected output current I1, and the like.

17 Claims, 2 Drawing Sheets

CIRCUIT STRUCTURE DIAGRAM OF POWER SUPPLY ACCORDING TO FIRST EMBODIMENT

FIG. 1 CIRCUIT STRUCTURE DIAGRAM OF POWER SUPPLY ACCORDING TO FIRST EMBODIMENT

FIG. 2 CIRCUIT STRUCTURE DIAGRAM OF POWER SUPPLY ACCORDING TO SECOND EMBODIMENT

CONTROL CIRCUIT OF POWER SUPPLY, POWER SUPPLY AND CONTROL METHOD THEREOF

CROSS-REFERENCE TO RELATED APPLICATIONS

This application is based upon and claims the benefit of priority from the prior Japanese Patent Application No. 2006-74777 filed on Mar. 17, 2006, the entire contents of which are incorporated herein by reference.

BACKGROUND OF THE INVENTION

1. Field of the Invention

The present invention relates to a control circuit of a power supply, a power supply and control method thereof.

2. Description of Related Art

Because reduction of the voltage of a power supply has been accelerated with progress of integration in integrated circuits (IC) in recent years, consumption of power has been reduced so as to achieve power saving. The threshold voltage of a MOS transistor loaded on an IC has been dropping with reduction of the voltage of the power supply in the IC of recent years. The reduction of the threshold voltage deteriorates the current interruption characteristic in a sub-threshold region, so that leak current sometimes flows out even in OFF state in which no voltage is applied between the gate and source of the MOS transistor. Thus, influences of the leak current cannot be neglected to achieve the power saving by reducing the consumption amount of power.

To suppress a flow of leak current in the MOS transistor, arts described in Japanese Unexamined Patent Publication H7-176624 and Japanese Unexamined Patent Publication H7-111314 have been known. In the integrated circuit described in the Japanese Unexamined Patent Publication H7-176624, when the PMOS transistor is off, a back gate voltage higher than when the PMOS transistor is on is applied to the back gate of the PMOS transistor and a back gate voltage lower than when the NMOS transistor is on is applied to the back gate of the NMOS transistor so as to raise the threshold voltage of each transistor, thereby suppressing the flow of leak current and reducing the consumption of power.

In the integrated circuit described in the Japanese Unexamined Patent Publication H7-111314, its back bias generating circuit applies a voltage higher than the voltage of the power supply to the N substrate of the PMOS transistor and applies a voltage lower than the grounding voltage to the P substrate of the NMOS transistor so as to raise the threshold voltage of each transistor and reduce the junction capacity, thereby suppressing the flow of the leak current and reducing the consumption amount of power.

SUMMARY OF THE INVENTION

A power supply is connected to the above-described integrated circuit to apply a voltage to the MOS transistor. Although as described in the Japanese Unexamined Patent Publication H7-176624, the flow of leak current is suppressed to reduce the consumption amount of power of the integrated circuit to achieve the power saving when the back gate voltage is applied to each transistor, the on-resistance of the transistor increases when the transistor is in on-state if the back gate voltage is applied to the transistor, so that the operation velocity of the integrated circuit lowers thereby possibly prolonging the delay time of the integrated circuit.

The present invention has been proposed in these circumstances and an object of the invention is to provide a control circuit of a power supply, a power supply and control method thereof capable of achieving power saving of the integrated circuit and reducing the delay time of the integrated circuit.

According to a first aspect of the present invention, there is provided a control circuit of power supply and according to a second aspect of the invention, there is provided a power supply. The power supply directed to both aspects outputs plural DC voltages each having a different voltage value, and both the control circuit of power supply directed to the first aspect and the power supply directed to the second aspect are characterized by comprising: a voltage changing portion that detects an output current relating to a first DC voltage that is one of the plural DC voltages and sets up at least one DC voltage except the first DC voltage based on the detected output current.

According to the control circuit of the power supply of the first aspect of the invention and the power supply of the second aspect of the invention, the voltage changing portion detects an output current relating to a first DC voltage which is one of the plurality of DC voltages and sets up at least one DC voltage except the first DC voltage based on the detected output current. Consequently, the voltage changing portion detects an output current relating to the value of the power supply voltage (first DC voltage) of a semiconductor device and if the back gate voltage (a DC voltage) to be outputted to the semiconductor device is changed appropriately, the threshold voltage can be raised thereby preventing any leak current from flowing to the semiconductor device and suppressing consumption of power by that leak current to achieve power saving.

Further, according to the control circuit of the power supply of the first aspect of the invention and the power supply of the second aspect of the invention, if the voltage changing portion changes the back gate voltage (a DC voltage) to be outputted to the semiconductor device appropriately, the on-resistance of the semiconductor device can be reduced correspondingly to changes of the back gate voltage, thereby accelerating the operation velocity of the semiconductor device and shortening the delay time of the semiconductor device.

According to a third aspect of the present invention, there is provided a control method of power supply for outputting plural DC voltages each having a different voltage value, comprising the steps of: detecting an output current relating to a first DC voltage that is one of the plural DC voltages; and setting up at least one DC voltage except the first DC voltage based on the detected output current.

According to the control method of the power supply of the third aspect of the present invention, an output current relating to a first DC voltage which is one of the plurality of DC voltages is detected, and at least one DC voltage except the first DC voltage is set based on the detected output current. Consequently, if the output current relating to the value of the power supply voltage (first DC voltage) of the semiconductor device is detected and the back gate voltage (a DC voltage) to be outputted to the semiconductor device is changed appropriately, the threshold voltage can be raised thereby preventing any leak current from flowing to the semiconductor device and suppressing consumption of power by that leak current to achieve power saving.

Further, according to the control method of the power supply of the third aspect of the present invention, if the back gate voltage (a DC voltage) to be outputted to the semiconductor device is changed appropriately, the on resistance of the semiconductor device can be reduced corresponding to changes of the back gate voltage thereby accelerating the operation velocity of the semiconductor device and shortening the delay time of the semiconductor device.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First Embodiment

Figure 1:
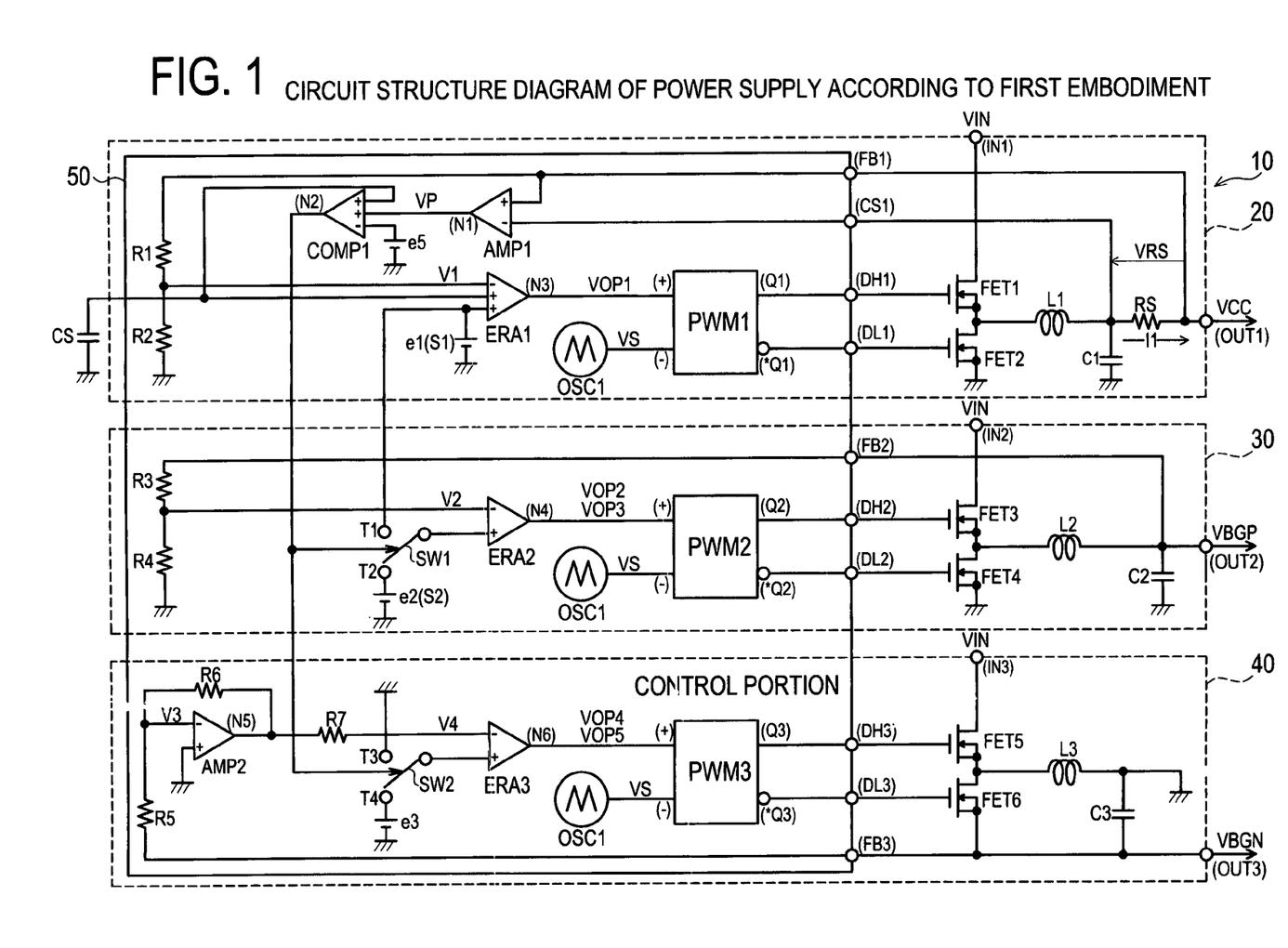
FIG. 1 is a circuit structure diagram of a power supply according to a first embodiment of the present invention.

The first embodiment of the present invention will be described with reference to FIG. 1. FIG. 1 is a circuit structure diagram of a power supply 10 according to the first embodiment. The power supply 10, as shown in the same Figure, comprises a first DC-DC converter 20, a second DC-DC converter 30, a third DC-DC converter 40 and a control portion 50. In the meantime, the control portion 50 is formed of an integrated circuit (IC), constituting the control circuit of the present invention.

The first DC-DC converter 20 comprises a main switching transistor FET1, a synchronous side switching transistor FET2, a choke coil L1, a capacitor C1 and a sense resistor RS. Further, the control portion 50 comprises resistors R1, R2, an amplifier AMP1, a comparator COMP1, an error amplifier ERA1, a triangular wave oscillator OSC1 and a PWM comparator PWM1.

In the main switching transistor FET1, as shown in the same Figure, an input terminal (IN1) is connected to its drain so that DC input voltage VIN is applied thereto via the input terminal (IN1). The source of the main switching transistor FET1 is connected to the drain of a synchronous side switching transistor FET2. The source of the synchronous side switching transistor FET2 is connected to the ground. Further, the source of the main switching transistor FET1 and the drain of the synchronous side switching transistor FET2 are connected to a choke coil L1. The choke coil L1 is connected to a sense resistor RS in series. This sense resistor RS is connected to an output terminal (OUT1). Further, a capacitor C1 is connected between a connection point of the choke coil L1 and the sense resistor RS and the ground.

Both ends of the sense resistor RS are connected to the input terminal (FB1) and input terminal (CS1) of the control portion 50. The input terminal (FB1) is connected to the ground via resistors R1, R2 connected in series and connected to the non-inverting input terminal of the amplifier AMP1. On the other hand, the input terminal (CS1) is connected to the inverting input terminal of the amplifier AMP1.

The output terminal (N1) of the amplifier AMP1 is connected to a second non-inverting input terminal of the comparator COMP1 as shown in the same Figure. In this comparator COMP1, as shown in the same Figure, its first non-inverting input terminal is connected to a soft start capacitor CS and a reference voltage e5 is applied to its inverting input terminal. This reference voltage e5 is set to a value smaller than a voltage (error amplifying voltage VP) obtained by amplifying the voltage value of a voltage VRS generated when a current I1 in the Figure flows more than a predetermined value. The output terminal (N2) of the comparator COMP1 is connected to the switch SW1 of a second DC-DC converter 30 and the switch SW2 of a third DC-DC converter 40. According to this embodiment, a switch SW1 and a switch SW2 are constituted of a logical circuit (multiplexer). When the first DC-DC converter 20 is started, the soft start capacitor CS is charged by a constant current circuit (not shown) so that the voltage of the soft start capacitor CS rises gradually from the ground voltage. The comparator COMP1 compares a higher voltage of the voltage inputted to the first non-inverting input terminal and the voltage inputted to the second non-inverting input terminal with the reference voltage e5. When the voltage inputted to the non-inverting input terminal is higher than the reference voltage e5, the comparator COMP1 outputs a high level signal. When the first DC-DC converter 20 is started, the comparator COMP1 compares the voltage of the soft start capacitor CS with the reference voltage e5 and outputs a low level signal. After that, if the first DC-DC converter 20 terminates its startup action and proceeds to its normal action, the comparator COMP1 compares the error amplifying voltage VP with the reference voltage e5 because the voltage of the soft start capacitor CS is sufficiently high. Because the amplifier AMP1 amplifies the voltage VRS, the comparator COMP1 outputs a high level signal when the current I1 flowing through the sense resistor RS is larger than a predetermined value (the error amplifying voltage VP is higher than the reference voltage e5).

In an error amplifier ERA1, a connection point of the resistor R1 and the resistor R2 is connected to its inverting input terminal. A voltage V1 obtained by dividing a power supply voltage VCC of an external apparatus (for example, electronic apparatus) with the resistor R1 and the resistor R2 is applied to its inverting input terminal. In the error amplifier ERA1, the smoothing capacitor CS and the first non-inverting input terminal of the comparator COMP1 are connected to the first non-inverting input terminal and the reference voltage e1 is applied to the second non-inverting input terminal. The value of this reference voltage e1 is set so that when the value of the voltage e1 becomes equal to the value of the voltage V1 applied to the inverting input, the value of the power supply voltage VCC turns to a target voltage value.

The PWM comparator PWM1 includes a plus side input terminal (+) and a minus side input terminal (−) as shown in the same Figure. This plus side input terminal (+) is connected to the output terminal (N3) of the error amplifier ERA1. On the other hand, the minus side input terminal (−) is connected to a triangular wave oscillator OSC1. The triangular wave oscillator OSC1 outputs a triangular wave signal VS. This triangular wave signal VS oscillates in a specified range of the voltage value (for example, 1.0 V to 2.0 V).

The output terminal (Q1) of the PWM comparator PWM1 is connected to the gate of the main switching transistor FET1 via a non-inverting output terminal (DH1). On the other hand, the output terminal (*Q1) of the PWM comparator PWM1 is connected to the gate of the synchronous side switching transistor FET2 via an inverting output terminal (DL1). In this embodiment, the output terminal (OUT1) is connected to an external apparatus (for example, electronic apparatus).

The second DC-DC converter 30 comprises a main switching transistor FET3, a synchronous side switching transistor FET4, a choke coil L2 and a capacitor C2. Further, the control portion 50 comprises resistors R3, R4, an error amplifier ERA2, a switch SW1, a triangular wave oscillator OSC1 and a PWM comparator PWM2.

In a main switching transistor FET3, an input terminal (IN2) is connected to its drain so that DC input voltage VIN is applied thereto via an input terminal (IN2). The source of a main switching transistor FET3 is connected to the drain of the synchronous side switching transistor FET4. The source of the synchronous side switching transistor FET4 is connected to the ground. Further, the source of the main switching transistor FET3 and the drain of the synchronous side switching transistor FET4 are connected to the choke coil L2. This choke coil L2 is connected to an output terminal (OUT2). A capacitor C2 is connected between the output terminal (OUT2) and the ground. In the meantime, according to this embodiment, the output terminal (OUT2) is connected to the back gate of the PMOS transistor of an external apparatus (for example, electronic apparatus).

The output terminal (OUT2) is connected to the input terminal (FB2) of the control portion 50. The input terminal (FB2) is connected to the ground via resistors R3, R4 connected in series. In the error amplifier ERA2, a connection point of the resistor R3 and resistor R4 is connected to its inverting input terminal. A voltage V2 obtained by dividing the back gate voltage VBGP of the PMOS transistor with the resistors R3, R4 is applied to this inverting input terminal.

On the other hand, a switch SW1 is connected to the non-inverting input terminal of the error amplifier ERA2. The reference voltage e1 or the reference voltage e2 is applied to this non-inverting input terminal via the switch SW1. When the value of the reference voltage e2 becomes equal to a voltage V2 applied to the inverting input terminal, the value of the voltage VBGP turns to a target voltage value and the reference voltage e2 is set to a larger value than the reference voltage e1.

A PWM comparator PWM2 has a plus side input terminal (+) and a minus side input terminal (−). This plus side input terminal (+) is connected to the output terminal (N4) of the error amplifier ERA2. On the other hand, the minus side input terminal (−) is connected to the triangular wave oscillator OSC1 like the aforementioned PWM comparator PWM1.

The output terminal (Q2) of the PWM comparator PWM2 is connected to the gate of the main switching transistor FET3 via a non-inverting output terminal (DH2). On the other hand, the output terminal (*Q2) of the PWM comparator PWM2 is connected to the gate of the synchronous side switching transistor FET4 via an inverting output terminal (DL2).

The third DC-DC converter 40 comprises a main switching transistor FET5, a synchronous side switching transistor FET6, a choke coil L3 and a capacitor C3. The control portion 50 includes resistors R5-R7, an amplifier AMP2, an error amplifier ERA3, a switch SW2, a triangular wave oscillator OSC1 and a PWM comparator PWM3.

In a main switching transistor FET5, an input terminal (IN3) is connected to its drain so that DC input voltage VIN is applied thereto via the input terminal (IN3). The source of the main switching transistor FET5 is connected to the drain of a synchronous side switching transistor FET6. The source of the synchronous side switching transistor FET6 is connected to the output terminal (OUT3). Further, the source of the main switching transistor FET5 and the drain of the synchronous side switching transistor FET6 are connected to a choke coil L3. This choke coil L3 is connected to the ground. A capacitor C3 is connected between the output terminal (OUT3) and the ground. According to this embodiment, the output terminal (OUT3) is connected to the back gate of a NMOS transistor of an external apparatus (for example, electronic apparatus).

The output terminal (OUT3) is connected to the input terminal (FB3) of the control portion 50. The output terminal (OUT3) is connected to the inverting input terminal of an amplifier AMP2 via a resistor R5. A voltage V3, which is a result of feeding back the back gate voltage VBGN of the NMOS transistor via a resistor R5, is applied to this inverting input terminal. On the other hand, the non-inverting input terminal of the amplifier AMP2 is connected to the ground. A feedback resistor R6 is connected between the output terminal (N5) of the amplifier AMP2 and the non-inverting input terminal of the amplifier AMP2 as shown in the same Figure.

The output terminal (N5) of the amplifier AMP2 is connected to the inverting input terminal of the error amplifier ERA3 via a resistor R7. On the other hand, a switch SW2 is connected to the non-inverting input terminal of the error amplifier ERA3. Grounding voltage or the reference voltage e3 is applied to this non-inverting input terminal via the switch SW2. The value of the reference voltage e3 is set so that when the value of the voltage e3 becomes equal to the value of the voltage V4 applied to the inverting input terminal, the value of the voltage VBGN turns to a target voltage value.

The PWM comparator PWM3 has a plus side input terminal (+) and minus side input terminal (−). This plus side input terminal (+) is connected to the output terminal (N6) of the error amplifier ERA3. On the other hand, the minus side input terminal (−) is connected to the triangular wave oscillator OSC1 like the PWM comparators PWM1, PWM2.

The output terminal (Q3) of the PWM comparator PWM3 is connected to the gate of the main switching transistor FET5 via a non-inverting output terminal (DH3). On the other hand, the output terminal (*Q3) of the PWM comparator PWM3 is connected to a synchronous side switching transistor FET6 via an inverting output terminal (DL3).

Next, the control method of the power supply 10 will be described with reference to FIG. 1. The first DC-DC converter 20 controls the value of the power supply voltage VCC by turning on/off the transistors FET1, FET2 alternately. This first DC-DC converter 20 can control the power supply voltage VCC to a target voltage value with respect to the DC input voltage VIN by changing the ratio (duty ratio) between the on time TON of the main switching transistor FET1 and the off time TOFF of the main switching transistor FET1. According to this embodiment, the power supply voltage VCC is supplied to an external apparatus via the output terminal (OUT1).

The relation between the input voltage VIN and power supply voltage VCC is expressed in a following expression.

$$VCC=\{TON/(TON+TOFF)\} \times VIN$$

where TON/(TON+TOFF): duty ratio

The resistors R1, R2 divides the power supply voltage VCC and the voltage V1 obtained by the dividing is inputted to the error amplifier ERA1. The error amplifier ERA1 compares the voltage V1 with the reference voltage e1 and outputs the error output voltage VOP1 to the PWM comparator PWM1. This error output voltage VOP1 is obtained by inversion amplifying an error voltage between the reference voltage e1 and the voltage V1.

In the PWM comparator PWM1, the error output voltage VOP1 is inputted to the plus side input terminal (+) and the triangular wave signal VS is inputted to the minus side input terminal (−) from the triangular wave oscillator OSC1. The PWM comparator PWM1 compares the error output voltage VOP1 with the voltage value of the triangular wave signal VS.

If the error output voltage VOP1 is larger than the voltage value of the triangular wave signal VS, the PWM comparator PWM1 outputs a high level PWM signal from the output terminal (Q1). At this time, the PWM comparator PWM1 outputs a low level inverted PWM signal from the inverting output terminal (*Q1). On the other hand, if the error output voltage VOP1 is smaller than the voltage value of the triangular wave signal VS, the PWM comparator PWM1 outputs a low level PWM signal from the output terminal (Q1). At this time, the PWM comparator PWM1 outputs a high level inverted PWM signal from the inverting output terminal (*Q1).

If the voltage V1 is lower than the reference voltage e1, the error output voltage VOP1 increases so that the period in which the PWM signal turns to high level (TON) is prolonged. Consequently, the aforementioned duty ratio increases so that the power supply voltage VCC rises. To the contrary, if the voltage V1 is higher than the reference voltage e1, the error output voltage VOP1 decreases so that the period in which the PWM signal turns to low level (TOFF) is prolonged. Thus, the aforementioned duty ratio decreases so that the power supply voltage VCC drops.

The PWM signal is inputted to the gate of the main switching transistor FET1 via the non-inverting output terminal (DH1). The main switching transistor FET1 turns to on when the PWM signal is of high level and turns to off when it is of low level. Further, the inverted PWM signal is inputted to the gate of the synchronous side switching transistor FET2 via the inverting output terminal (DL1). The synchronous side switching transistor FET2 turns to off when the inverted PWM signal is of low level and turns to on when it is of high level. When the PWM signal changes repeatedly with a predetermined duty between high level and low level and at the same time, the inverted PWM signal changes repeatedly with a predetermined duty between low level and high level, the power supply voltage VCC is controlled by a target voltage and supplied to a power terminal of an external apparatus (for example, electronic apparatus) via the output terminal (OUT1).

The first DC-DC converter 20 of this embodiment operates as follows when the power supply voltage VCC is supplied to the external apparatus. When the first DC-DC converter 20 supplies the power supply voltage VCC to the external apparatus, the current I1 flows through the sense resistor RS as shown in the same Figure. This current I1 generates a voltage VRS between both ends of the sense resistor RS. Then, this voltage VRS is applied to the inverting input terminal and non-inverting side input terminal of the amplifier AMP1 as shown in the same Figure. This amplifier AMP1 has a function as a buffer.

According to this embodiment, the power supply voltage VCC corresponds to a first DC voltage of the present invention because it is one of the voltages (power supply voltage VCC and back gate voltages VBGP, VBGN) which the power supply 10 supplies to the external apparatus. The current I1 corresponds to the output current of the present invention because it changes corresponding to a load of an external apparatus (not shown) and is related to the power supply voltage VCC as understood from FIG. 1. Further, the sense resistor RS corresponds to the resistor device of the present invention because it conducts the current I1 and converts the current I1 to the voltage VRS. According to this embodiment, the sense resistor RS and amplifier AMP1 correspond to the detecting portion (voltage changing portion) of the present invention.

The amplifier AMP1 outputs the error amplifying voltage VP. This error amplifying voltage VP has a value proportional to a difference of potential (VRS) between the potential at an end of the sense resistor RS and the potential at the other end of the resistor RS and corresponds to the detection value of the present invention. The error amplifying voltage VP is inputted to the second non-inverting input terminal of the comparator COMP1. The comparator COMP1 compares the error amplifying voltage VP with the reference voltage e5. When the error amplifying voltage VP is larger than the reference voltage e5, this comparator COMP1 outputs a high level signal. When the comparator COMP1 outputs a high level signal, the power supply voltage VCC is supplied to an external apparatus, the current I1 flows more than a predetermined value and the value of the error amplifying voltage VP exceeds the value of the reference voltage e5.

On the other hand, when the error output signal VP is smaller than the reference voltage e5, the comparator COMP1 outputs a low level signal. When the comparator COMP1 outputs a low level signal, no power supply voltage is supplied to the external apparatus and no current I1 flows. In the meantime, the comparator COMP1 corresponds to the comparing portion (voltage changing portion) of the present invention because it compares the error amplifying voltage VP with the reference voltage e5 and outputs a high level signal or a low level signal.

The second DC-DC converter 30 operates as follows when the comparator COMP1 of the first DC-DC comparator 20 outputs a high level signal. The second DC-DC converter 30 controls the value of the back gate voltage VBGP by turning on/off the transistors FET3, FET4 alternately like the first DC-DC converter 20 described above. Description of the same control method as the first DC-DC converter 20 is omitted here. According to this embodiment, the back gate voltage VBGP is supplied to the back gate of the PMOS transistor of an external apparatus via the output terminal (OUT2).

The resistors R3, R4 divide the back gate voltage VBGP and the voltage V2 obtained by the dividing is inputted to the error amplifier ERA2. The switch SW1 is connected to the terminal T1 when it receives a high level signal outputted from the comparator COMP1. Consequently, the reference voltage e1 is applied to the non-inverting input terminal of the error amplifier ERA2 via the switch SW1.

The error amplifier ERA2 compares the voltage V2 with the reference voltage e1 and outputs the error output voltage VOP2 to the PWM comparator PWM2. This error output voltage VOP2 is obtained by inversion amplifying the error voltage between the reference voltage e1 and the voltage V2.

In the PWM comparator PWM2, as shown in the same Figure, the error output voltage VOP2 is inputted to the plus side input terminal (+) and the triangular wave signal VS is inputted to the minus side input terminal (−). The PWM comparator PWM2 operates in the same manner as the PWM comparator PWM1 described above so that the back gate voltage VBGP is controlled to have the same value as the power supply voltage VCC and supplied to the back gate of the PMOS transistor via the output terminal (OUT2). The reference voltage e1 corresponds to the first selection voltage of the present invention because the voltage value of the back gate voltage VBGP is set to substantially the same as the voltage value of the power supply voltage VCC (first DC voltage). Further, the power supply S1 of the reference voltage e1 corresponds to the first power supply of the present invention because it is used to set the voltage value of the back gate voltage VBGP to substantially the same value as the voltage value of the power supply voltage VCC.

On the other hand, the second DC-DC converter 30 operates as follows when the comparator COMP1 of the first DC-DC converter 20 outputs a low level signal. The switch SW1 is connected to the terminal T2 when it receives the low level signal. Consequently, the reference voltage e2 is applied to the non-inverting input terminal of the error amplifier ERA2 via the switch SW2. The value of this reference voltage e2 is set to a larger value than the reference voltage e1. In the meantime, the switch SW1 corresponds to the first changing portion (voltage changing portion) of the present invention because it is connected to the terminal T1 or terminal T2 when it receives the high level signal or the low level signal so that it is connected to the power supply S1 or the power supply S2 of the reference voltage e2.

The error amplifier ERA2 compares the voltage V2 with the reference voltage e2 and outputs the error output voltage VOP3 to the PWM comparator PWM2. This error output voltage VOP3 is obtained by inversion amplifying the error voltage between the reference voltage e2 and the voltage V2.

In the PWM comparator PWM2, the error output voltage VOP3 is inputted to the plus side input terminal (+) and the triangular wave signal VS is inputted to the minus side input terminal (−). The PWM comparator PWM2 operates in the same manner as the PWM comparator PWM1 so that the back gate voltage VBGP is controlled to have a larger value than the power supply voltage VCC and supplied to the back gate of the PMOS transistor via the output terminal (OUT2). Here, the reference voltage e2 corresponds to the second selection voltage of the present invention because the voltage value of the back gate voltage VBGP is set preliminarily to be larger than the voltage value of the power supply voltage VCC (first DC voltage). Further, the power supply S2 of the reference voltage e2 corresponds to the second power supply of the present invention because it is used to set the voltage value of the back gate voltage VBGP to a value larger than the voltage value of the power supply voltage VCC.

The third DC-DC converter 40 operates as follows when the comparator COMP1 of the first DC-DC converter 20 outputs a high level signal. Description of the same control method as the first and second DC-DC converters 20, 30 will be omitted here. The third DC-DC converter 40 controls the value of the back gate voltage VBGN by turning on/off the transistors FET5, FET6 alternately like the first and second DC-DC converters 20, 30. According to this embodiment, the back gate voltage VBGN having a negative voltage value is supplied to the back gate of the NMOS transistor of an external apparatus via the output terminal (OUT3).

The switch SW2 is connected to the terminal T4 when it receives a high level signal outputted from the comparator COMP1. Consequently, the reference voltage e3 is applied to the non-inverting input terminal of the error amplifier ERA3 via the switch SW2.

The error amplifier ERA3 outputs the error output voltage VOP4 to the PWM comparator PWM3 by comparing the voltage V4 with the reference voltage e3. This error output signal VOP4 is obtained by inversion amplifying the error voltage between the reference voltage e3 and the voltage V4.

In the PWM comparator PWM3, the error output voltage VOP4 is inputted to the plus side input terminal (+) and the triangular wave signal VS is inputted to the minus side input terminal (−). The PWM comparator PWM3 operates in the same manner as the PWM comparators PWM1 and PWM2, so that the back gate voltage VBGN is controlled to possess a target voltage value and supplied to the back gate of the NMOS transistor via the output terminal (OUT3).

On the other hand, the third DC-DC converter 40 operates as follows when the comparator COMP1 of the first DC-DC comparator 20 outputs a low level signal. The switch SW2 is connected to the terminal T3 when it receives the low level signal. Consequently, the grounding voltage is applied to the non-inverting input terminal of the error amplifier ERA3 via the switch SW2. In the meantime, the switch SW2 corresponds to the second changing portion (voltage changing portion) of the present invention because when it receives the high level signal or the low level signal, it is connected to the terminal T3 or the terminal T4 to select the grounding voltage or the reference voltage e3.

The error amplifier ERA3 compares the voltage V4 with the grounding voltage and outputs the error output voltage VOP5 to the PWM comparator PWM3. This error output voltage VOP5 is obtained by inversion amplifying the error voltage between the grounding voltage and the voltage V4.

In the PWM comparator PWM3, the error output voltage VOP5 is inputted to the plus side input terminal (+) and the triangular wave signal VS is inputted to the minus side input terminal (−). The PWM comparator PWM3 operates in the same manner as the PWM comparators PWM1 and PWM2, so that the back gate voltage VBGN is controlled to possess the grounding voltage value and supplied to the back gate of the NMOS transistor via the output terminal (OUT3).

Effect of First Embodiment

The power supply 10 of the above-described first embodiment and its control circuit detect the current I1 with the sense resistor RS and amplifier AMP1 and change the values of the back gate voltages VBGP, VBGN based on the current I1 using the comparator COMP1 and the switches SW1, SW2. According to this embodiment, the sense resistor RS and the amplifier AMP1 detect the current I1 supplied to the external apparatus and controls the back gate voltage VBGP to a larger value than the power supply voltage VCC using the comparator COMP1 and the switch SW1 when the external apparatus is in a standby condition so as to raise the threshold voltage and prevent a leak current from flowing to the PMOS transistor, thereby preventing power from being consumed by the leak current and achieving power saving.

Further, the power supply 10 of this embodiment and the control circuit control the back gate voltage VBGP to the same value as the power supply voltage VCC using the comparator COMP1 and the switch SW1 when the external apparatus is in an operating condition so that the on-resistance of the PMOS transistor can be decreased as compared to the case where the value of the back gate voltage VBGP is controlled to a value larger than the power supply voltage VCC, thereby accelerating the operation velocity of the PMOS transistor and shortening the delay time of the PMOS transistor.

According to the control method of the power supply 10 of this embodiment, the current I1 is detected and the values of the back gate voltages VBGP, VBGN are changed based on the current I1. According to this embodiment, the current I1 supplied to the external apparatus is detected and when the external apparatus is in the standby condition, the value of the back gate voltage VBGP is controlled to a value larger than the value of the power supply voltage VCC, so as to raise the threshold voltage, preventing a leak current from flowing to the PMOS transistor, thereby preventing power from being consumed by the leak current and achieving power saving.

Additionally, according to the control method of the power supply 10 of this embodiment, when the external apparatus is in its operating condition, the value of the back gate voltage VBGP is controlled to substantially the same value as the power supply voltage VCC so that the on-resistance of the PMOS transistor can be decreased as compared with the case where the value of the back gate voltage VBGP is controlled to a larger value than the power supply voltage VCC, thereby accelerating the operation velocity of the PMOS transistor and shortening the delay time of the PMOS transistor.

The power supply 10 of this embodiment and its control circuit select the reference voltage for use in setting the back gate voltages VBGP, VBGN from the reference voltages e1-e3 set preliminarily based on a result of comparison made by the comparator COMP1 in comparing a voltage (error amplifying voltage VP) obtained by amplifying a different of potential (VRS) between both ends of the sense resistor RS with the reference voltage e5 or the voltage of the soft start capacitor CS. According to this embodiment, in each of the comparison of the comparator COMP1, the switches SW1, SW2 can select the reference voltage for use in setting the back gate voltages VBGP, VBGN from the reference voltages e1-e3 to optimize a selected reference voltage for changing the threshold voltage.

Further, according to the power supply 10 of this embodiment and its control circuit, in each of comparison by the comparator COMP1, the switches SW1, SW2 select a reference voltage for use in setting the back gate voltages VBGP, VBGN from the reference voltages e1-e3 and can optimize a selected reference voltage for reducing the on-resistance of the PMOS transistor and NMOS transistor and accelerating the operation velocity of the PMOS transistor and NMOS transistor.

Further, according to the control method of the power supply 10 of this embodiment, the reference voltage for use in setting the back gate voltages VBGP, VBGN is selected from the previously set reference voltages e1-e3 based on a result of comparing a voltage (error amplifying voltage VP) obtained by amplifying a difference of potential (VRS) originating from the current I1 with the reference voltage e5. According to this embodiment, the reference voltage for use in setting the back gate voltages VBGP, VBGN is selected from the reference voltages e1-e3 in each of comparing the error amplifying voltage VP with the reference voltage e5 or the voltage of soft start capacitor CS and a selected reference standard can be optimized for changing the threshold voltage.

Additionally, according to the control method of the power supply 10 of this embodiment, the reference voltage for use in setting the back gate voltages VBGP, VBGN is selected from the reference voltages e1-e3 in each of comparing the error amplifying voltage VP with the reference voltage e5 or the voltage of the soft start capacitor CS and a selected standard voltage can be optimized for reducing the on-resistance of the PMOS transistor and NMOS transistor and accelerating the operation velocity of the PMOS transistor and NMOS transistor.

The power supply 10 of the first embodiment comprises a resistor device RS for conducting the current I1 to convert to the voltage VRS and an amplifier AMP1 to which the current I1 converted to the voltage VRS is inputted. According to this embodiment, the current I1 can be converted to the voltage VRS with a simple structure (resistor device RS) and the input impedance is raised by the amplifier AMP1 (buffer). Consequently, it never happens that the current I1 flows into the amplifier AMP1, so that a current flowing to the external apparatus can be detected accurately.

Further, the control circuit of the power supply 10 of this embodiment is provided with the amplifier AMP1 to which the value of the current I1 converted by the voltage VRS is inputted. Because in this embodiment, the input impedance is raised by the amplifier AMP1 (buffer), the current I1 can be prevented from flowing into the amplifier AMP1.

When in the power supply 10 of the first embodiment and its control circuit, it is determined that the voltage (error amplifying voltage VP) obtained by amplifying a difference of potential (VRS) between both ends of the sense resistor RS is larger than the value of the reference voltage e5 based on a comparison result of the comparator COMP1, the switch SW1 is connected to the terminal T1 to select the reference voltage e1. According to this embodiment, when the external apparatus is in the operating condition in which the current I1 flows through the resistor RS by more than a predetermined value and the error amplifying voltage VP becomes larger than the reference voltage e5, the value of the back gate voltage VBGP may be set to substantially the same value as the power supply voltage VCC so that the on resistance of the PMOS transistor is decreased as compared with the case where the value of the back gate voltage VBGP is set to a larger value than the power supply voltage VCC, thereby accelerating the operation velocity of the PMOS transistor and shortening the delay time of the PMOS transistor.

According to the power supply 10 of this embodiment and its control circuit, when it is determined that the error amplifying voltage VP is smaller than the value of the reference voltage e5 based on the a comparison result of the comparator COMP1, the switch SW1 is connected to the terminal T2 to select the reference voltage e2. According to this embodiment, when the external apparatus is in the standby state in which no current I1 flows through the resistor RS and the error amplifying voltage VP becomes smaller than the reference voltage e5, the value of the back gate voltage VBGP is set to a value larger than the value of the power supply voltage VCC, so that the threshold voltage is raised as compared with a case where the value of the back gate voltage VBGP is set to substantially the same value as the power supply voltage VCC, thereby preventing a leak current from flowing into the PMOS transistor so as to suppress consumption of power by the leak current and achieve power saving.

Further, according to the control method of the power supply 10 of this embodiment, when it is determined that the error amplifying voltage VP is larger than the value of the reference voltage e5 based on a result of comparing the error amplifying voltage VP with the value of the reference voltage e5, the reference voltage e1 is selected. According to this embodiment, the error amplifying voltage VP becomes larger than the value of the reference voltage e5 and when the external apparatus is in the operating condition, the value of the back gate voltage VBGP is set to substantially the same as the value of the power supply voltage VCC, so that the on-resistance of the PMOS transistor is decreased as compared with a case where the value of the back gate voltage VBGP is set to a larger value than the value of the power supply voltage VCC, thereby accelerating the operation velocity of the PMOS transistor and shortening the delay time of the PMOS transistor.

Additionally, according to the control method of the power supply 10 of this embodiment, when it is determined that the error amplifying voltage VP is smaller than the value of the reference voltage e5, the reference voltage e2 is selected. According to this embodiment, the error amplifying voltage VP becomes smaller than the reference voltage e5 and when the external apparatus is in the standby state, the value of the back gate voltage VBGP is set to a larger value than the value of the power supply voltage VCC, so that the threshold voltage is raised as compared with a case where the value of the back gate voltage VBGP is set to the same value as the power supply voltage VCC, thereby preventing any leak current from flowing into the PMOS transistor and suppressing consumption of power by the leak current to achieve power saving.

According to the power supply 10 of the first embodiment and its control circuit, when the back gate voltage VBGP is set to substantially the same value as the power supply voltage VCC with the reference voltage e1 (first selection voltage), the on-resistance of the PMOS transistor can be decreased when the external apparatus is in the operating state, as compared with a case where the voltage value is set to a larger value than the power supply voltage VCC, thereby accelerating the operation velocity of the PMOS transistor and shortening the delay time of the PMOS transistor.

According to the power supply 10 of this embodiment and its control circuit, when the back gate voltage VBGP is set to a larger value than the power supply voltage VCC with the reference voltage e2 (second selection voltage), the threshold voltage can be set to a higher value when the external apparatus is in the standby state as compared with a case where the voltage value is set to substantially the same value as the power supply voltage VCC, thereby preventing any leak current from flowing into the PMOS transistor and suppressing consumption of power by the leak current to achieve power saving.

Further, according to the control method of the power supply 10 of this embodiment, if the back gate voltage is set using the reference voltage e1 (first selection voltage) and the back gate voltage is outputted to the back gate of the PMOS transistor when the external apparatus is in the operating state, the on-resistance of the PMOS transistor can be decreased as compared with a case where a voltage larger than the power supply voltage VCC is outputted to the back gate, thereby accelerating the operation velocity of the PMOS transistor and shortening the delay time of the PMOS transistor.

Additionally, according to the control method of the power supply 10 of this embodiment, if the back gate voltage is outputted to the back gate of the PMOS transistor when the back gate voltage is set with the reference voltage e2 (second selection voltage) and the external apparatus is in the standby state, the threshold voltage can be set to a higher value as compared with a case where a voltage smaller than the power supply voltage VCC is outputted to the back gate, thereby preventing any leak current from flowing to the PMOS transistor and suppressing consumption of power with the leak current to achieve power saving.

According to the power supply 10 of the first embodiment and its control circuit, when it is determined that a voltage (error amplifying voltage VP) obtained by amplifying a difference of potential (VRS) between both ends of the sense resistor RS is larger than the value of the reference voltage e5 based on a comparison result of the comparator COMP1, the switch SW2 is connected to the terminal T3 to select the grounding voltage. According to this embodiment, if the current I1 flows through the resistor RS by more than a predetermined value and the error amplifying voltage VP becomes larger than the reference voltage e5, the value of the back gate voltage VBGN is set to the grounding voltage, so that the on-resistance of the NMOS transistor can be decreased when the external apparatus is in the operating state as compared with a case where the value of the back gate voltage VBGN is not set to the grounding voltage, thereby accelerating the operation velocity of the NMOS transistor and shortening the delay time of the NMOS transistor.

According to the power supply 10 of this embodiment and its control circuit, when it is determined that the error amplifying voltage VP is smaller than the value of the reference voltage e5 based on a comparison result of the comparator COMP1, the switch SW2 is connected to the terminal T4 to select the reference voltage e3. According to this embodiment, when the no current I1 flows through the resistor RS so that the error amplifying voltage VP becomes smaller than the value of the reference voltage e5, the value of the back gate voltage VBGN is set to a smaller value than when the switch SW2 is connected to the terminal T3 (absolute value is increased), so that the threshold voltage can be raised when the external apparatus is in its standby state as compared with a case where the value of the back gate voltage VBGN is set to the grounding voltage, thereby preventing any leak current from flowing to the NMOS transistor and suppressing consumption of power by the leak current to achieve power saving.

According to the power supply 10 of the first embodiment and its control circuit, when the back gate voltage VBGN is set with the grounding voltage so that its voltage value is that grounding voltage value, the on-resistance of the NMOS transistor can be decreased when the external apparatus is in its operating condition as compared with a case where the voltage value is not set to the grounding voltage value, thereby accelerating the operation velocity of the NMOS transistor and shortening the delay time of the NMOS transistor.

Further, according to the power supply 10 of this embodiment and its control circuit, if the voltage value of the back gate voltage VBGN is set to a smaller value (whose absolute value is large) than when the grounding voltage is used, with the reference voltage e3, the threshold voltage can be set to a higher value when the external apparatus is in its standby state as compared with a case where the back gate voltage VBGN is set to the grounding voltage, thereby preventing any leak current from flowing to the NMOS transistor and suppressing consumption of power with the leak current to achieve power saving.

According to the control method of the power supply 10 of this embodiment, if the back gate voltage VBGN is set with the grounding voltage and the back gate voltage VBGN is outputted to the back gate of the NMOS transistor when the external apparatus is in its operating state, the on-resistance of the NMOS transistor can be decreased as compared with a case where the back gate voltage VBGN set with the reference voltage e3 is outputted to the back gate of the NMOS transistor, thereby accelerating the operation velocity of the NMOS transistor and shortening the delay time of the NMOS transistor.

According to the control method of the power supply 10 of this embodiment, if the back gate voltage VBGN is set with the reference voltage e3 and the back gate voltage VBGN is outputted to the back gate of the NMOS transistor when the external apparatus is in its standby state, the threshold voltage can be set to a higher value as compared with a case where the back gate voltage is set with the grounding voltage and the back gate voltage is outputted to the back gate of the NMOS transistor, thereby preventing any leak current from flowing into the NMOS transistor and suppressing consumption of power with the leak current to achieve power saving.

Second Embodiment

Figure 2:
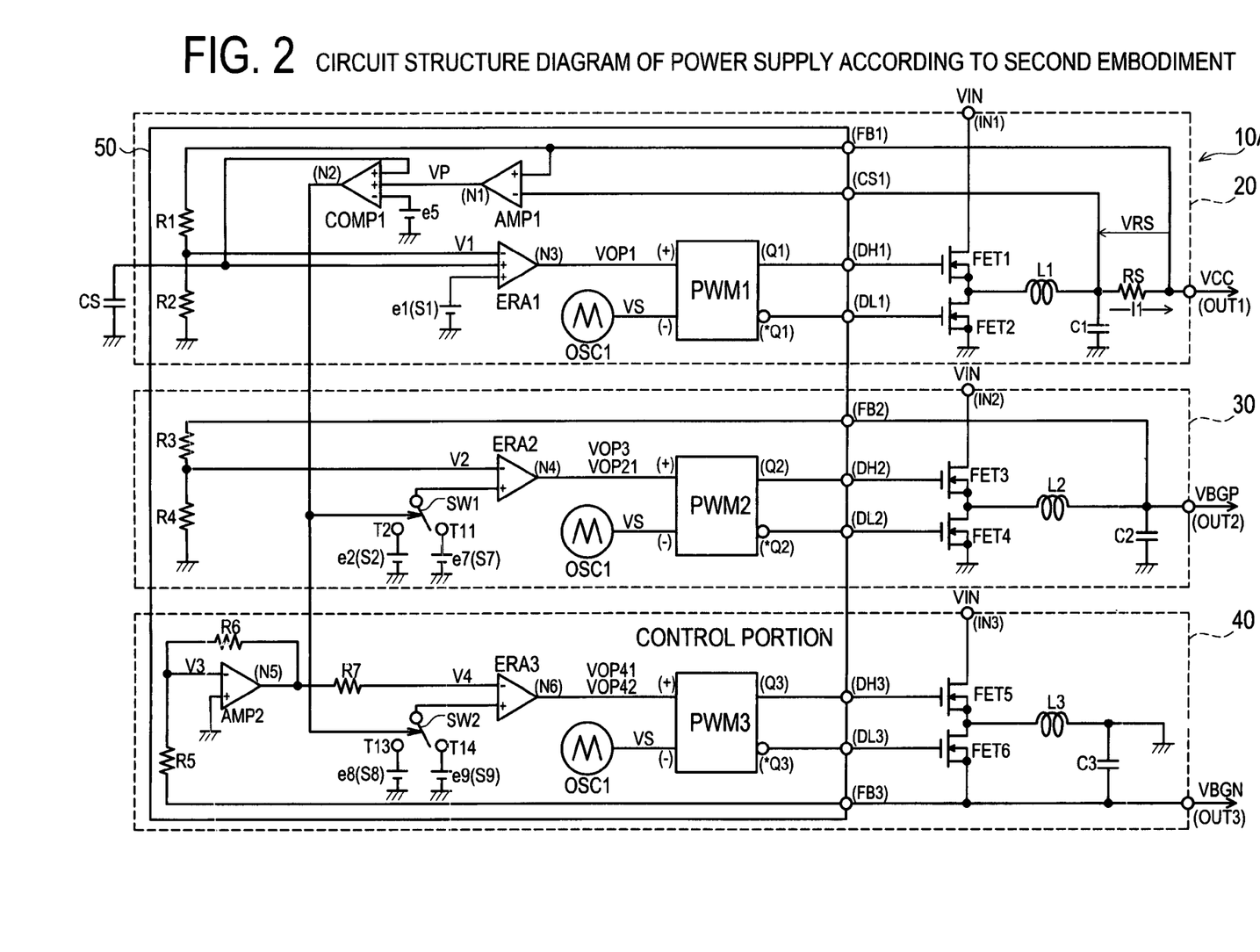
FIG. 2 is a circuit structure diagram of a power supply according to a second embodiment.

The second embodiment of the present invention will be described with reference to FIG. 2. FIG. 2 is a circuit structure diagram of a power supply 10A of the second embodiment. Description of the same structure as the first embodiment is omitted with like reference numerals attached to the same components. In the second DC-DC converter 30, as shown in the same Figure, the reference voltage e2 or reference voltage e7 is applied to the non-inverting input terminal of the error amplifier ERA2 via the switch SW1. The value of this reference voltage e7 is set to the same value as the reference voltage e1.

In the third DC-DC converter 40, as shown in FIG. 2, reference voltage e8 or reference voltage e9 is applied to the non-inverting input terminal of the error amplifier ERA3 via the switch SW2. The value of the reference voltage e8 is set to a smaller value than the reference voltage e1. Further, the value of the reference voltage e9 is set to a larger value than the reference voltage e8.

The second DC-DC converter 30 operates as follows if the comparator COMP1 of the first DC-DC converter 20 outputs a high level signal. The switch SW1 is connected to a terminal T11 when it receives the high level signal. Consequently, the reference voltage e7 is applied to the non-inverting input terminal of the error amplifier ERA2 via the switch SW1.

The error amplifier ERA2 compares the voltage V2 with the reference voltage e7 and outputs the error output signal VOP21 to the PWM comparator PWM2. This error output signal VOP21 is obtained by inversion amplifying the error voltage between the reference voltage e7 and the voltage V2.

According to this embodiment, the PWM comparator PWM2 operates in the same manner as the first embodiment so that the back gate voltage VBGP is controlled to possess substantially the same value as the power supply voltage VCC and supplied to the back gate of the PMOS transistor via the output terminal (OUT2). Here, the reference voltage e7 corresponds to the first selection voltage of the present invention because the value of the back gate voltage VBGP is set to substantially the same value as the power supply voltage VCC (first DC voltage). The power supply S7 of the reference voltage e7 corresponds to the first power supply of the invention because the value of the back gate voltage VBGP is set to substantially the same value as the value of the power supply voltage VCC.

On the other hand, the switch SW1 is connected to the terminal T2 when it receives the low level signal. Consequently, the reference voltage e2 is applied to the non-inverting input terminal of the error amplifier ERA2 via the switch SW1. According to this embodiment, the PWM comparator PWM2 operates in the same manner as the first embodiment, so that the back gate voltage VBGP is controlled to possess a larger value than the value of the power supply voltage VCC and supplied to the back gate of the PMOS transistor via the output terminal (OUT2).

The third DC-DC converter 40 operates as follows if the comparator COMP1 of the first DC-DC converter 20 outputs a high level signal. The switch SW2 is connected to a terminal T13 when it receives the high level signal. Consequently, a reference voltage e8 is applied to the non-inverting input terminal of the error amplifier ERA3 via the switch SW2.

The error amplifier ERA3 compares the voltage V4 with the reference voltage e8 and outputs the error output signal VOP41 to the PWM comparator PWM3. This error output signal VOP 41 is obtained by inversion amplifying the error voltage between the reference voltage e8 and the voltage V4.

According to this embodiment, the PWM comparator PWM3 operates in the same manner as the first embodiment so that the back gate voltage VBGN having a negative voltage value is controlled to possess a smaller value than the power supply voltage VCC and the grounding voltage and supplied to the back gate of the NMOS transistor through the output terminal (OUT3). The reference voltage e8 corresponds to the third selection voltage of the invention because the voltage value of the back gate voltage VBGN is set to a smaller value than the voltage value of the power supply voltage VCC (first DC voltage) and the grounding voltage value. The power supply S8 of the reference voltage e8 corresponds to the third power supply of the invention because the voltage value of the back gate voltage VBGN is set to a smaller value than the voltage value of the power supply voltage VCC and the grounding voltage value.

On the other hand, the switch SW2 is connected to a terminal T14 when it receives the low level signal. Consequently, the reference voltage e9 is applied to the non-inverting input terminal of the error amplifier ERA3 via the switch SW2.

The error amplifier ERA3 compares the voltage V4 with the reference voltage e9 and outputs the error output signal VOP42 to the PWM comparator PWM3. This error output signal VOP42 is obtained by inversion amplifying the error voltage between the reference voltage e9 and the voltage V4.

According to this embodiment, the PWM comparator PWM3 operates in the same manner as the first embodiment so that the back gate voltage VBGN having a negative voltage value is supplied to the back gate of the NMOS transistor via the output terminal (OUT3). The reference voltage e9 corresponds to the fourth selection voltage of the invention because it is set so that the absolute voltage value of the back gate voltage VBGN becomes larger than when the switch SW2 is connected to the terminal T13. In the meantime, the power supply S9 of the reference voltage e9 corresponds to the fourth power supply of the invention because the absolute voltage value of the back gate voltage VBGN is used to set up a larger value than when the reference voltage e8 is used.

Effect of the Second Embodiment

According to the power supply 10A of the above-described second embodiment and its control circuit, when it is determined that a voltage (error amplifying voltage VP) obtained by amplifying a difference of potential (VRS) between both ends of the sense resistor RS is larger than the value of the reference voltage e5 based on a comparison result of the comparator COMP1, the switch SW1 is connected to the terminal T11 to select the reference voltage e7. According to this embodiment, the current I1 flows through the resistor RS by more than a predetermined value so that the error amplifying voltage VP becomes larger than the reference voltage e5 and when the external apparatus is in its operating state, the value of the back gate voltage VBGP is set to substantially the same value as the power supply voltage VCC, so that the on-resistance of the PMOS transistor can be reduced as compared with a case where the value of the back gate voltage VBGP is set to a larger value than the power supply voltage VCC, thereby accelerating the operation velocity of the PMOS transistor and shortening the delay time of the PMOS transistor.

Further, according to the control method of the power supply 10A of this embodiment, when it is determined that the error amplifying voltage VP is larger than the value of the reference voltage e5 based on a result of comparing the error amplifying voltage VP with the value of the reference voltage e5, the reference voltage e7 is selected. According to this embodiment, the error amplifying voltage VP becomes larger than the reference voltage e5 and the value of the back gate voltage VBGP is set to the same value as the power supply voltage VCC when the external apparatus is in is operating state, so that the on-resistance of the PMOS transistor can be reduced as compared with a case where the value of the back gate voltage VBGP is set to a larger value than the power supply voltage VCC, thereby accelerating the operation velocity of the PMOS transistor and shortening the delay time of the PMOS transistor.

According to the power supply 10A of the second embodiment and its control circuit, when it is determined that the voltage (error amplifying voltage VP) obtained by amplifying a difference of potential (VRS) between both ends of the sense resistor RS is larger than the value of the reference voltage e5 based on a comparison result of the comparator COMP1, the switch SW2 is connected to the terminal T13 to select the reference voltage e8. According to this embodiment, when the current I1 flows through the resistor RS by more than a predetermined value so that the error amplifying voltage VP becomes larger than the value of the reference voltage e5, the value of the back gate voltage VBGN is set to a smaller value than the power supply voltage VCC and grounding voltage, so that the on-resistance of the NMOS transistor can be decreased when the external apparatus is in its operating state as compared with a case where the value of the back gate voltage VBGN is set to a larger value than the power supply voltage VCC and the grounding voltage, thereby accelerating the operation velocity of the NMOS transistor and shortening the delay time of the NMOS transistor.

Further, according to the power supply 10A of this embodiment and its control circuit, when it is determined that the error amplifying voltage VP is smaller than the value of the reference voltage e5 based on a comparison result of the comparator COMP1, the switch SW2 is connected to the terminal T14 to select the reference voltage e9. According to this embodiment, when no current I1 flows through the resistor RS so that the error amplifying voltage VP becomes smaller than the reference voltage e5, the value of the back gate voltage VBGN is set to a larger value than when the switch SW2 is connected to the terminal T13, so that the threshold voltage can be increased as compared with a case where the switch SW2 is connected to the terminal T13, thereby preventing any leak current from flowing to the NMOS transistor and suppressing consumption of power by the leak current when the external apparatus is in its standby state and consequently power saving can be achieved.

According to the power supply 10A of the second embodiment and its control circuit, if the back gate voltage VBGN is set to a smaller value than the power supply voltage VCC and the grounding voltage with the reference voltage e8 (third selection voltage), the on-resistance of the NMOS transistor can be decreased when the external apparatus is in its operating state as compared with a case where that voltage value is set to a larger value than the power supply voltage VCC and the grounding voltage, thereby accelerating the operation velocity of the NMOS transistor and shortening the delay time of the NMOS transistor.

Further, according to the power supply 10A of this embodiment and its control circuit, if the absolute voltage value of the back gate voltage VBGN is set to a larger value with the reference voltage e9 (fourth selection voltage) than when the reference voltage e8 is used, the threshold voltage can be set to a higher value when the external apparatus is in its standby state as compared with a case where the back gate voltage VBGN is set with the reference voltage e8, thereby preventing any leak current from flowing into the NMOS transistor and suppressing consumption of power by the leak current.

According to the control method of the power supply 10A of this embodiment, if the back gate voltage VBGN is set with the reference voltage e8 (third selection voltage) and the back gate voltage VBGN is outputted to the back gate of the NMOS transistor when the external apparatus is in its operating state, the on-resistance of the NMOS transistor can be decreased as compared with a case where a voltage whose value is larger than the power supply voltage VCC and the grounding voltage is outputted to the back gate of the NMOS transistor, thereby accelerating the operation velocity of the NMOS transistor and shortening the delay time of the NMOS transistor.

Additionally, according to the control method of the power supply 10A of this embodiment, if the back gate voltage VBGN is set with the reference voltage e9 (fourth selection voltage) and the back gate voltage VBGN is outputted to the back gate of the NMOS transistor when the external apparatus is in its standby state, the threshold voltage can be set to a larger value as compared with a case where the back gate voltage is set with the reference voltage e8 (third selection voltage) and the back gate voltage is outputted to the back gate of the NMOS transistor, thereby preventing any leak current from flowing into the NMOS transistor and suppressing consumption of power with the leak current to achieve power saving.

The present invention is not restricted to the above-described embodiments but may be carried out by modifying part of its structure within a range not departing from the spirit of the invention. In the power supply 10A of the second embodiment and its control circuit, the value of the reference voltage e7 is set not only to the same value as the reference voltage e1 but also a value larger than the value of the reference voltage e1 and smaller than the value of the reference voltage e2. In the meantime, the control portion 50 of the power supplies 10, 10A of the above embodiment may be constituted of a single semiconductor chip or plural semiconductor chips. Further, the power supplies 10, 10A may be constructed of a single semiconductor chip or plural semiconductor chips. Further, the electronic apparatus may utilize a power supply including the control portion and DC-DC converter.

According to the control circuit of the power supply, the power supply and control method of the present invention, because an output current relating to the first DC voltage, which is one of the plurality of DC voltages, is detected and at least one DC voltage except the first DC voltage is set up based on the detected output current, if an output current relating to the value of the power supply voltage (first DC voltage) of a semiconductor device is detected and the back gate voltage (a DC voltage) outputted to the semiconductor device is changed appropriately, the threshold voltage can be increased, thereby preventing any leak current from flowing to the semiconductor device and suppressing consumption of power by the leak current to achieve power saving.

Further, according to the control circuit of the power supply, power supply and control method of the present invention, if the back gate voltage (a DC voltage) outputted to the semiconductor device is changed appropriately, the on-resistance of the semiconductor device can be decreased corresponding to change of the back gate voltage, thereby accelerating the operation velocity of the semiconductor device and shortening the delay time of the semiconductor device.

What is claimed is:

1. A control circuit of power supply for outputting plural DC voltages, comprising:
    a plurality of control units each of which controls any one of the plural DC voltages each having a different voltage value;
    a voltage changing portion that detects an output current relating to a first DC voltage that is one of the plural DC voltages and sets up at least one DC voltage which is included in the plural DC voltages except the first DC voltage based on the detected output current,
    wherein the voltage changing portion comprises:
        a detecting portion for detecting the output current;
        a comparing portion for outputting a result of comparison between a detection value of the detecting portion and a reference voltage value; and
        a selecting portion for selecting, by switching, one of setting voltages, each of which is used in setting the at least one DC voltage, from plural setting voltages based on the comparison result, and wherein the first DC voltage and the at least one DC voltage are supplied with different supply destinations, respectively.

2. The control circuit of power supply according to claim 1, wherein the detecting portion includes a buffer in which the value of the output current converted to a voltage is inputted to output the detection value.

3. The control circuit of power supply according to claim 1, wherein the preliminarily set plural setting voltages include: a first selection voltage set to the first DC voltage and a second selection voltage set to a larger value than the voltage value of the first selection voltage; a first power supply for supplying the first selection voltage and a second power supply for supplying the second selection voltage are provided; the selecting portion includes a first changing portion that is connected to any one of the first power supply and the second power supply; and when it is determined that the detection value is larger than the reference voltage value based on the comparison result, the selecting portion selects the first selection voltage by connecting the first changing portion to the first power supply and when it is determined that the detection value is smaller than the reference voltage value based on the comparison result, selects the second selection voltage by connecting the first changing portion to the second power supply.

4. The control circuit of power supply according to claim 3, wherein the first DC voltage is a power supply voltage to be outputted to the power supply terminal of a P type semiconductor device and the DC voltage having a voltage value set by the first selection voltage and the second selection voltage is a back gate voltage outputted to the back gate of the P type semiconductor device.

5. The control circuit of power supply according to claim 1, wherein the preliminarily set plural setting voltages include: a third selection voltage set to a smaller value than the voltage value of the first DC voltage and a fourth selection voltage set to a larger value than the voltage value of the third selection voltage; a third power supply for supplying the third selection voltage and a fourth power supply for supplying the fourth selection voltage are provided; the selecting portion includes a second changing portion that is connected to any one of the third power supply and the fourth power supply; and when it is determined that the detection value is larger than the reference voltage value based on the comparison result, the selecting portion selects the third selection voltage by connecting the second changing portion to the third power supply and when it is determined that the detection value is smaller than the reference voltage value based on the comparison result, selects the fourth selection voltage by connecting the second changing portion to the fourth power supply.

6. The control circuit of power supply according to claim 5, wherein the first DC voltage is a power supply voltage to be outputted to the power supply terminal of a N type semiconductor device and the DC voltage having a voltage value set by the third selection voltage and the fourth selection voltage is a back gate voltage outputted to the back gate of the N type semiconductor device.

7. A power supply for outputting plural DC voltages, comprising:
a plurality of control units each of which controls any one of the plural DC voltages each having a different voltage value;
a voltage changing portion that detects an output current relating to a first DC voltage that is one of the plural DC voltages and sets up at least one DC voltage which is included in the plural DC voltages except the first DC voltage based on the detected output current, wherein the voltage changing portion comprises:
a detecting portion for detecting the output current;
a comparing portion for outputting a result of comparison between a detection value of the detecting portion and a reference voltage value; and
a selecting portion for selecting, by switching, one of setting voltages, each of which is used in setting the at least one DC voltage, from plural setting voltages based on the comparison result, and
wherein the first DC voltage and the at least one DC voltage are supplied with different supply destinations respectively.

8. The power supply according to claim 7, wherein the detecting portion includes: a resistor device for conducting the output current to convert to a voltage; and a buffer in which the value of the output current converted to a voltage by the resistor device is inputted to output the detection value.

9. The power supply according to claim 7, wherein the preliminarily set plural setting voltages include: a first selection voltage set to the first DC voltage and a second selection voltage set to a larger value than the voltage value of the first selection voltage; a first power supply for supplying the first selection voltage and a second power supply for supplying the second selection voltage are provided; the selecting portion includes a first changing portion that is connected to any one of the first power supply and the second power supply; and when it is determined that the detection value is larger than the reference voltage value based on the comparison result, the selecting portion selects the first selection voltage by connecting the first changing portion to the first power supply and when it is determined that the detection value is smaller than the reference voltage value based on the comparison result, selects the second selection voltage by connecting the first changing portion to the second power supply.

10. The power supply according to claim 9, wherein the first DC voltage is a power supply voltage to be outputted to the power supply terminal of a P type semiconductor device and the DC voltage having a voltage value set by the first selection voltage and the second selection voltage is a back gate voltage outputted to the back gate of the P type semiconductor device.

11. The power supply according to claim 7, wherein the preliminarily set plural setting voltages include a third selection voltage set to a smaller value than the voltage value of the first DC voltage and a fourth selection voltage set to a larger value than the voltage value of the third selection voltage; a third power supply for supplying the third selection voltage and a fourth power supply for supplying the fourth selection voltage are provided; the selecting portion includes a second changing portion that is connected to any one of the third power supply and the fourth power supply; and when it is determined that the detection value is larger than the reference voltage value based on the comparison result, the selecting portion selects the third selection voltage by connecting the second changing portion to the third power supply and when it is determined that the detection value is smaller than the reference voltage value based on the comparison result, selects the fourth selection voltage by connecting the second changing portion to the fourth power supply.

12. The power supply according to claim 11, wherein the first DC voltage is a power supply voltage to be outputted to the power supply terminal of a N type semiconductor device and the DC voltage having a voltage value set by the third selection voltage and the fourth selection voltage is a back gate voltage outputted to the back gate of the N type semiconductor device.

13. A control method of power supply for outputting plural DC voltages, comprising:
  controlling any one of the plural DC voltages each having a different voltage value;
  detecting an output current relating to a first DC voltage that is one of the plural DC voltages; and
  setting up at least one DC voltage which is included in the plural DC voltages except the first DC voltage based on the detected output current,
  wherein the output current is detected; a result of comparison between a detection value originating from the output current and a reference voltage value is outputted; and a setting voltage, which is used in setting the at least one DC voltage, is selected from plural setting voltages by switching based on the result of comparison, and
  wherein the first DC voltage and the at least one DC voltage are supplied with different supply destinations respectively.

14. The control method of power supply according to claim 13, wherein the preliminarily set plural setting voltages include a first selection voltage set to the first DC voltage and a second selection voltage set to a larger value than the voltage value of the first selection voltage and when it is determined that the detection value is larger than the reference voltage value based on the comparison result, the first selection voltage is selected and when it is determined that the detection value is smaller than the reference voltage value based on the comparison result, the second selection voltage is selected.

15. The control method of power supply according to claim 14 further comprising outputting the first DC voltage to the power supply terminal of a P type semiconductor device and outputting the DC voltage having a voltage value set by the first selection voltage and the second selection voltage to the back gate of the P type semiconductor device.

16. The control method of power supply according to claim 13, wherein the preliminarily set plural setting voltages include a third selection voltage set to a smaller value than the voltage value of the first DC voltage and a fourth selection voltage set to a larger value than the voltage value of the third selection voltage and when it is determined that the detection value is larger than the reference voltage value based on the comparison result, the third selection voltage is selected and when it is determined that the detection value is smaller than the reference voltage value based on the comparison result, the fourth selection voltage is selected.

17. The control method of power supply according to claim 16, wherein the first DC voltage is outputted to the power supply terminal of the N type semiconductor device and the DC voltage having a voltage value set by the third selection voltage and the fourth selection voltage is outputted to the back gate of the N type semiconductor device.

* * * * *